US012163510B2

(12) United States Patent
Liu et al.

(10) Patent No.: US 12,163,510 B2
(45) Date of Patent: Dec. 10, 2024

(54) CONTROL METHOD AND CONTROL DEVICE APPLIED TO ELECTRIC FRACTURING APPARATUS

(71) Applicant: YANTAI JEREH PETROLEUM EQUIPMENT & TECHNOLOGIES CO., LTD., Shandong (CN)

(72) Inventors: Kaishen Liu, Shandong (CN); Xiance Li, Shandong (CN); Zhuqing Mao, Shandong (CN); Shuzhen Cui, Shandong (CN); Song Zhang, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 542 days.

(21) Appl. No.: 17/368,613

(22) Filed: Jul. 6, 2021

(65) Prior Publication Data

US 2022/0307359 A1 Sep. 29, 2022

(30) Foreign Application Priority Data

Mar. 25, 2021 (CN) ........................ 202110318395.X

(51) Int. Cl.
*F04B 39/02* (2006.01)
*F04B 35/04* (2006.01)
*G08B 21/18* (2006.01)

(52) U.S. Cl.
CPC .............. *F04B 39/02* (2013.01); *F04B 35/04* (2013.01); *F04B 39/0207* (2013.01);
(Continued)

(58) Field of Classification Search
CPC .............. F04B 39/0207; F04B 39/0261; F04B 39/0276; F04B 2203/0209; F04B 2205/05
See application file for complete search history.

(56) References Cited

U.S. PATENT DOCUMENTS

| | | | |
|---|---|---|---|
| 599,804 | A | 3/1898 | Short |
| 3,788,775 | A | 1/1974 | Leutner et al. |

(Continued)

FOREIGN PATENT DOCUMENTS

| | | | |
|---|---|---|---|
| CN | 102032167 | A | 4/2011 |
| CN | 103470485 | A | 12/2013 |

(Continued)

OTHER PUBLICATIONS

Non-Final Office Action for U.S. Appl. No. 17/949,978 mailed on Jan. 18, 2023.

(Continued)

*Primary Examiner* — Christopher S Bobish
(74) *Attorney, Agent, or Firm* — Sheppard Mullin Richter & Hampton LLP

(57) ABSTRACT

A control method and a control device applied to an electric fracturing apparatus are provided. The electric fracturing apparatus includes a plunger pump and a first motor configured to drive the plunger pump, and the method includes: acquiring a preset displacement of the plunger pump; acquiring a rotation speed of the first motor and a discharge pressure of the plunger pump; determining a real-time displacement of the plunger pump based on the rotation speed of the first motor and the discharge pressure of the plunger pump and adjusting the real-time displacement; and upon the real-time displacement reaching the preset displacement, allowing the first motor to be kept in a stable operation state.

14 Claims, 11 Drawing Sheets

(52) U.S. Cl.
CPC ...... *F04B 39/0261* (2013.01); *F04B 39/0276* (2013.01); *G08B 21/182* (2013.01); *F04B 2203/0209* (2013.01); *F04B 2205/05* (2013.01)

(56) References Cited

U.S. PATENT DOCUMENTS

| | | | | |
|---|---|---|---|---|
| 4,248,194 | A * | 2/1981 | Drutchas | F02D 41/2464 123/390 |
| 4,527,965 | A * | 7/1985 | Markley | F04C 29/0014 184/39.1 |
| 5,483,139 | A * | 1/1996 | Welles, II | H02P 1/423 318/782 |
| 5,520,517 | A * | 5/1996 | Sipin | F04B 49/06 417/44.11 |
| 6,347,516 | B1 * | 2/2002 | Bolz | F04B 49/06 60/434 |
| 6,468,042 | B2 * | 10/2002 | Møller | G05D 16/2066 417/44.11 |
| 6,537,032 | B1 * | 3/2003 | Horiuchi | F04D 15/0066 417/18 |
| 7,870,900 | B2 * | 1/2011 | Dorado | E21B 47/008 417/42 |
| 8,302,394 | B2 * | 11/2012 | Ochi | F04B 49/08 60/403 |
| 8,303,260 | B2 * | 11/2012 | Stavale | F04D 15/0209 417/42 |
| 9,356,551 | B2 * | 5/2016 | Berry | H02P 29/60 |
| 9,534,605 | B2 * | 1/2017 | Gale | B60R 17/02 |
| 9,678,511 | B2 * | 6/2017 | Stavale | G05D 7/0635 |
| 9,777,750 | B2 * | 10/2017 | Sugano | E02F 9/2296 |
| 9,869,311 | B2 * | 1/2018 | Du | F04B 49/002 |
| 9,970,278 | B2 * | 5/2018 | Broussard | E21B 43/2607 |
| 10,041,824 | B2 * | 8/2018 | Skovmose | G01F 1/86 |
| 11,408,417 | B1 | 8/2022 | Stephenson et al. | |
| 11,549,506 | B2 | 1/2023 | Harvell et al. | |
| 11,891,884 | B2 * | 2/2024 | Wilson | F04B 49/06 |
| 2009/0252616 | A1 * | 10/2009 | Brunet | F04B 49/065 417/1 |
| 2014/0174717 | A1 | 6/2014 | Broussard et al. | |
| 2016/0032703 | A1 * | 2/2016 | Broussard | E21B 43/2607 166/250.01 |
| 2017/0115674 | A1 | 4/2017 | Lopez et al. | |
| 2018/0258926 | A1 * | 9/2018 | Jackle | F04B 17/03 |
| 2019/0120024 | A1 * | 4/2019 | Oehring | E21B 44/00 |
| 2019/0234398 | A1 * | 8/2019 | Endo | F04B 49/20 |
| 2019/0316447 | A1 | 10/2019 | Oehring et al. | |
| 2020/0263525 | A1 | 8/2020 | Reid et al. | |
| 2021/0025382 | A1 | 1/2021 | Harvell et al. | |
| 2021/0040830 | A1 | 2/2021 | Mu et al. | |
| 2022/0178235 | A1 | 6/2022 | Zhang et al. | |
| 2022/0251936 | A1 * | 8/2022 | Wilson | F04B 9/10 |
| 2022/0307359 | A1 | 9/2022 | Liu et al. | |
| 2022/0316306 | A1 | 10/2022 | Liu et al. | |
| 2023/0003111 | A1 | 1/2023 | Yeung et al. | |

FOREIGN PATENT DOCUMENTS

| | | | |
|---|---|---|---|
| CN | 203409994 | U | 1/2014 |
| CN | 104265473 | A | 1/2015 |
| CN | 104536368 | A | 4/2015 |
| CN | 104834336 | A | 8/2015 |
| CN | 105965319 | A | 9/2016 |
| CN | 107237617 | A | 10/2017 |
| CN | 107544304 | A | 1/2018 |
| CN | 107605873 | A | 1/2018 |
| CN | 108442912 | A | 8/2018 |
| CN | 108506707 | A | 9/2018 |
| CN | 108757415 | A | 11/2018 |
| CN | 208430992 | U | 1/2019 |
| CN | 210003481 | U | 1/2020 |
| CN | 211950463 | U | 11/2020 |
| CN | 112283088 | A | 1/2021 |
| CN | 112302610 | A | 2/2021 |
| CN | 112311299 | A | 2/2021 |
| CN | 112324615 | A | 2/2021 |
| CN | 112412426 | A | 2/2021 |
| CN | 212614660 | U | 2/2021 |
| CN | 112943203 | A | 6/2021 |
| CN | 112983798 | A | 6/2021 |
| CN | 113153716 | A | 7/2021 |
| CN | 113586414 | A | 11/2021 |
| CN | 114151056 | A | 3/2022 |
| CN | 114198292 | A | 3/2022 |
| CN | 114482968 | A | 5/2022 |
| DE | 2111359 | A1 | 9/1972 |
| JP | 2006336842 | A | 12/2006 |
| WO | 2017048543 | A1 | 3/2017 |

OTHER PUBLICATIONS

First Office Action for Chinese Application No. 202280002682.2 mailed on Jun. 28, 2023.

Written Opinion and International Search Report for International Application No. PCT/CN2022/101178 mailed Dec. 19, 2022.

First Search for Chinese Application No. 202110318395.X mailed on Jul. 28, 2022.

Written Opinion of the International Searching Authority and International Search Report for PCT Application No. PCT/CN2021/102406 mailed on Dec. 30, 2021 with partial English machine translation.

Office Action for Canadian Application No. 3173698 mailed on Oct. 15, 2024.

* cited by examiner

CONTROL METHOD AND CONTROL DEVICE APPLIED TO ELECTRIC FRACTURING APPARATUS

CROSS REFERENCE TO RELATED APPLICATIONS

The application claims priority to the Chinese patent application No. 202110318395.X, filed on Mar. 25, 2021, the entire disclosure of which is incorporated herein by reference as part of the present application.

TECHNICAL FIELD

At least one embodiment of the present disclosure relates to a control method applied to an electric fracturing apparatus, and a control device applied to electric fracturing apparatus.

BACKGROUND

Shale gas is a kind of natural gas extracted from shale, is mainly composed of methane and is an important unconventional natural gas resource. The formation and enrichment of the shale gas has its own unique characteristics, and the shale gas is usually distributed in the bottom of shale which has a thick basin and is widely distributed. Compared with conventional natural gas, the shale gas is more difficult to develop and requires higher construction equipment and technology. Fracturing refers to a method of forming fractures in an oil-gas reservoir by hydraulic action in the process of extracting oil and gas, also known as hydraulic fracturing.

SUMMARY

At least one embodiment of the present disclosure provides a control method applied to an electric fracturing apparatus, the electric fracturing apparatus comprises a plunger pump and a first motor configured to drive the plunger pump, and the method comprises: acquiring a preset displacement of the plunger pump; acquiring a rotation speed of the first motor and a discharge pressure of the plunger pump; determining a real-time displacement of the plunger pump based on the rotation speed of the first motor and the discharge pressure of the plunger pump and adjusting the real-time displacement; and upon the real-time displacement reaching the preset displacement, allowing the first motor to be kept in a stable operation state.

For example, in the control method provided by at least one embodiment of the present disclosure, determining the real-time displacement of the plunger pump based on the rotation speed of the first motor and the discharge pressure of the plunger pump, comprises: determining a displacement factor according to the rotation speed of the first motor; determining a displacement factor correction coefficient according to the discharge pressure of the plunger pump; determining a corrected displacement factor according to the displacement factor and the displacement factor correction coefficient; and determining the real-time displacement of the plunger pump based on the corrected displacement factor.

For example, in the control method provided by at least one embodiment of the present disclosure, a correspondence relationship between the discharge pressure of the plunger pump and the displacement factor correction coefficient is stored in a look-up table, determining the displacement factor correction coefficient according to the discharge pressure of the plunger pump, comprises: searching the displacement factor correction coefficient corresponding to the discharge pressure of the plunger pump in the look-up table.

For example, in the control method provided by at least one embodiment of the present disclosure, the electric fracturing apparatus further comprises a second motor configured to drive the first motor and an auxiliary system of the plunger pump, and the method further comprises: in response to start or stop of the first motor, allowing the second motor to be automatically started or stopped, and automatically controlling the second motor to run in a stable state after the second motor is automatically started.

For example, in the control method provided by at least one embodiment of the present disclosure, automatically controlling the second motor to run in the stable state after the second motor is automatically started, comprises: acquiring a preset parameter and a first actual parameter of the electric fracturing apparatus; judging whether the first actual parameter is greater than the preset parameter, wherein if the first actual parameter is greater than the preset parameter, the rotation speed of the second motor is adjusted.

For example, the control method provided by at least one embodiment of the present disclosure, further comprises: optimizing a lubrication duration of the plunger pump; and optimizing the lubrication duration of the plunger pump comprises: setting the lubrication duration and a non-lubrication duration; after continuously lubricating the plunge pump for the lubrication duration, stopping lubricating the plunge pump for the non-lubrication duration, which is circulated in turn.

For example, the control method provided by at least one embodiment of the present disclosure, further comprises: optimizing a lubrication duration of the plunger pump; and optimizing the lubrication duration of the plunger pump comprises: setting a lubrication pulse number and a non-lubrication pulse number; and after continuously lubricating the plunger pump for the lubrication pulse number, stopping lubricating the plunger pump for the non-lubrication pulse number, which is circulated in turn.

For example, the control method provided by at least one embodiment of the present disclosure, further comprises: setting a preset threshold; acquiring a second actual parameter of the electric fracturing apparatus and a theoretical parameter of the electric fracturing apparatus; and judging whether a difference between the second actual parameter and the theoretical parameter is greater than the preset threshold, in which if the difference between the second actual parameter and the theoretical parameter is greater than the preset threshold, an abnormal alarm is given.

For example, in the control method provided by at least one embodiment of the present disclosure, the second actual parameter and the theoretical parameter are respectively an actual power of the first motor and a theoretical power of the first motor, or are respectively an actual temperature of a winding of the first motor and a theoretical temperature of the winding of the first motor, or are respectively an actual discharge pressure of the plunger pump and a theoretical discharge pressure of the plunger pump, or are respectively an actual power of the second motor and a theoretical power of the second motor, or are respectively an actual displacement of the plunger pump and a theoretical displacement of the plunger pump.

For example, in the control method provided by at least one embodiment of the present disclosure, the theoretical temperature of the winding of the first motor is obtained based on a current of the first motor, an ambient temperature and a heat dissipation power of a heat dissipation fan.

For example, in the control method provided by at least one embodiment of the present disclosure, the theoretical discharge pressure of the plunger pump is obtained based on a torque of the first motor.

For example, in the control method provided by at least one embodiment of the present disclosure, the second motor comprises an oil dispersion motor configured to dissipate heat from hydraulic oil, and acquiring the theoretical parameter of the electric fracturing apparatus, comprises: acquiring an inlet oil temperature of the hydraulic oil and an outlet oil temperature of the hydraulic oil; and acquiring a theoretical heat dissipation power as the theoretical parameter based on the inlet oil temperature of the hydraulic oil and the outlet oil temperature of the hydraulic oil.

For example, in the control method provided by at least one embodiment of the present disclosure, the second motor comprises a high and low pressure lubrication oil pump motor configured to lubricate the plunger pump, and acquiring the theoretical parameter of the electric fracturing apparatus, comprises: acquiring a lubrication oil pressure of the plunger pump and a rotation speed of the high and low pressure lubrication oil pump motor; and acquiring a theoretical lubrication power as the theoretical parameter based on the lubrication oil pressure and a rotation speed of the high and low pressure lubrication oil pump motor.

For example, the control method provided by at least one embodiment of the present disclosure, further comprises: acquiring a warning limit value of each motor of the electric fracturing apparatus and an alarm limit value of each motor of the electric fracturing apparatus; judging whether an actual power of the respective motor is greater than the warning limit value, in which if the actual power of the respective motor is greater than the warning limit value, a warning is given; and judging whether the actual power of the respective motor is greater than the alarm limit value, in which if the actual power is greater than the alarm limit value, the rotation speed of the respective motor is reduced, so that the actual power of the respective motor is lower than the warning limit value.

At least one embodiment of the present disclosure also provides a control device applied to an electric fracturing apparatus, the electric fracturing apparatus comprises a first motor configured to drive a plunger pump to operate, and the control device comprises: a first acquisition unit configured to acquire a preset displacement of the plunger pump; a second acquisition unit configured to acquire a rotation speed of the first motor and a discharge pressure of the plunger pump; an adjustment unit configured to determine a real-time displacement of the plunger pump based on the rotation speed of the first motor and the discharge pressure of the plunger pump and adjust the real-time displacement; and a keeping unit configured to keep the first motor in a stable operation state upon the real-time displacement reaching the preset displacement.

For example, in the control device provided by at least one embodiment of the present disclosure, the electric fracturing apparatus further comprises a second motor, and the second motor is configured to drive the first motor and an auxiliary system of the plunger pump, and be automatically started or stopped in response to the start or stop of the first motor, and be automatically controlled to run in a stable state after being automatically started.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
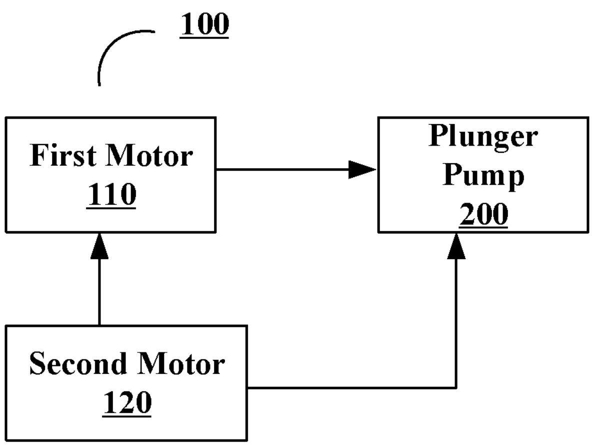
FIG. 1 is a structural schematic diagram of an electric drive fracturing device provided by at least one embodiment of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Generally, a fracturing apparatus includes a fracturing apparatus configured to pump high-pressure fluid into a well, a sand mixing apparatus configured to mix a proppant and fracturing fluid and supply the mixed fluid to the fracturing apparatus, and an instrumentation apparatus configured to monitor the whole fracturing apparatus group. In a traditional mode, the fracturing apparatus is driven by an engine, with low power density, high noise and serious emission pollution. As a new type of fracturing apparatus, an electric fracturing apparatus is driven by an electric motor and uses electric energy as power source. Because of advantages of high power density, low noise and no waste gas emission, etc., the electric fracturing apparatus is gradually applied in fracturing operations.

At least one embodiment of the present disclosure provides a control method applied to an electric fracturing apparatus, the electric fracturing apparatus comprises a plunger pump and a first motor configured to drive the plunger pump, and the method comprises: acquiring a preset displacement of the plunger pump; acquiring a rotation speed of the first motor and a discharge pressure of the plunger pump; determining a real-time displacement of the plunger pump based on the rotation speed of the first motor and the discharge pressure of the plunger pump and adjusting the real-time displacement; and upon the real-time displacement reaching the preset displacement, allowing the first motor to be kept in a stable running state.

At least one embodiment of the present disclosure provides a control device applied to the above mentioned control method.

In the control method provided by the embodiment of the present disclosure, on the one hand, by inputting a preset displacement, the first motor is automatically operated to the preset displacement and then kept at the current rotation speed, so as to achieve a stable operation state, and controlling of the rotation speed of the first motor by the displacement can be better adapted to the operation scene and is more friendly to user; on the other hand, by adjusting the real-time displacement of the plunger pump based on both the rotation speed of the first motor and the discharge pressure of the plunger pump, the displacement of the plunger pump can be corrected in real time, the metering accuracy is ensured, and the accuracy of pump efficiency calculation of the plunger pump is improved.

Embodiments of the present disclosure and some examples thereof are described in detail with reference to the accompanying drawings.

At least one embodiment of the present disclosure provides a control method applied to an electric fracturing apparatus.

FIG. 1 is a structural schematic diagram of an electric drive fracturing device provided by at least one embodiment of the present disclosure. For example, as shown in FIG. 1, in some examples, the electric fracturing apparatus 100 includes a first motor 110 and a plunger pump 200.

For example, the first motor 110 is a main motor, and is configured to drive the plunger pump 200 to operate, so as to realize the function of converting low-pressure liquid into high-pressure liquid, and displacement control of the plunger pump 200 is realized by controlling a rotation speed of the first motor 110. A pressure sensor is provided at a suction end of the plunger pump 200 and a discharge end of the plunger pump 200 to respectively detect a suction pressure and a discharge pressure of the plunger pump 200. The plunger pump 200 is provided with a lubrication system (not shown in the figure) configured to lubricate a power part. The lubrication system is provided with a pressure sensor and a temperature sensor which send out an alarm signal respectively in the case where the pressure and the temperature are abnormal.

For example, in other examples, the electric fracturing apparatus 100 further includes a second motor 120.

For example, the second motor 120 is an auxiliary motor configured to drive an auxiliary system of the first motor 110 and the plunger pump 200. For example, the auxiliary system includes a heat dissipation system of the first motor 110 or a lubrication system of the plunger pump 200 or a lubrication oil heat dissipation system of the plunger pump 200. For example, the second motor 120 includes a high and low pressure lubrication oil pump motor configured to lubricate the plunger pump 200 (for example, the high and low pressure lubrication oil pump motor includes a high pressure oil pump motor and a low pressure oil pump motor which are not shown in the figure), an oil dispersion motor (not shown in the figure) configured to dissipate heat from the lubrication oil (such as the hydraulic oil) and a heat dissipation fan (not shown in the figure) for dissipating heat from the first motor 110. For example, the high and low pressure lubrication oil pump motor is configured to drive the lubrication system in the auxiliary system, the oil dispersion motor is configured to drive the lubrication oil heat dissipation system, and the heat dissipation fan is configured to drive the heat dissipation system in the auxiliary system.

For example, the electric fracturing apparatus 100 may further include other devices, and the second motor 120 may further include other auxiliary motors, which may be determined according to actual conditions, and the embodiments of the present disclosure impose no limitation to this case.

The control method of the electric fracturing apparatus provided by at least one embodiment of the present disclosure is described in detail with reference to FIGS. 2-14.

Figure 2:
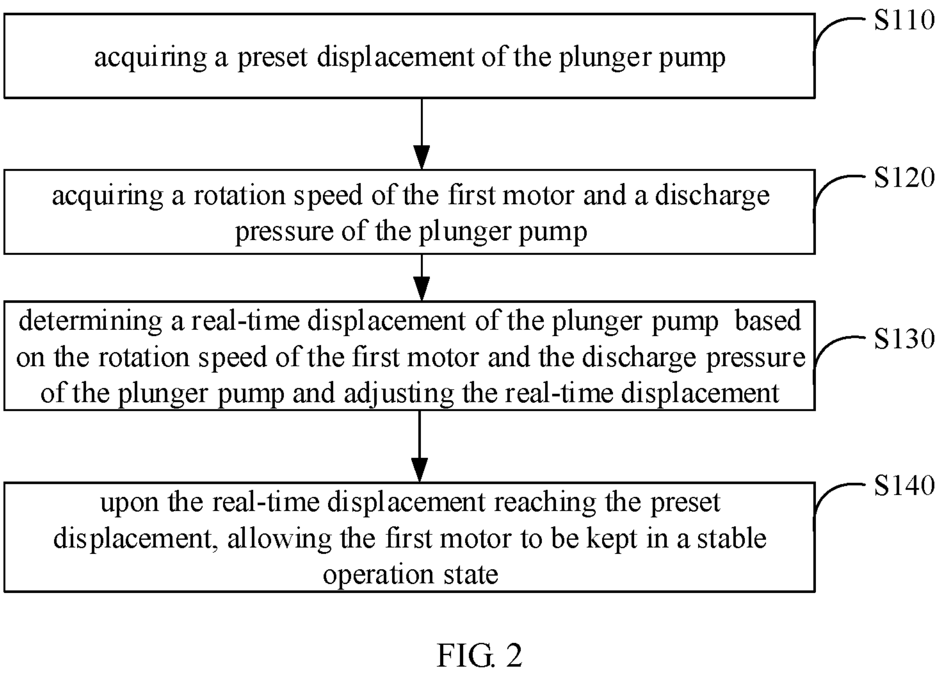
FIG. 2 is a flowchart of a control method provided by at least one embodiment of the present disclosure.

FIG. 2 is a flowchart of a control method provided by at least one embodiment of the present disclosure. For example, in some examples, as shown in FIG. 2, the control method includes steps S110 to S140.

Step S110: acquiring a preset displacement of the plunger pump.

Step S120: acquiring a rotation speed of the first motor and a discharge pressure of the plunger pump.

Step S130: determining a real-time displacement of the plunger pump based on the rotation speed of the first motor and the discharge pressure of the plunger pump and adjusting the real-time displacement.

Step S140: upon the real-time displacement reaching the preset displacement, allowing the first motor to be kept in a stable running state.

In the step S110, for example, in some examples, the control of the rotation speed of the first motor (for example, the rotation speed can be measured by a sensor) and the control of the displacement of the plunger pump can be realized according to different control modes. For example, in the case that a speed control mode is adopted, by inputting a set speed, the first motor automatically runs to the set speed and keeps stable, that is, keeps running at the set speed. For example, in the case that a displacement control mode is adopted (for example, the displacement is proportional to the rotation speed, which can be converted by a flow coefficient (for example, a displacement factor)), by inputting a preset displacement (for example, the input displacement value indirectly controls the speed), the first motor 110 automatically runs to the preset displacement and keeps stable, that is, keeps running at the corresponding rotation speed in the case where the preset displacement is reached. Compared with the traditional speed control mode, the setting of the displacement control mode can better adapt to the operation mode in the operation scene based on displacement control mode.

In this example, by inputting the set preset displacement, the first motor automatically runs to the set preset displacement and keeps stable, which can be better adapted to the operation scene. Because what the user is concerned about is the displacement, the user can directly input the preset displacement without converting the preset displacement into the rotation speed to input, so it is friendly to the user.

In the step S120, for example, in some examples, the rotation speed of the first motor 110 and the discharge pressure of the plunger pump 200 are acquired. For example, the rotation speed of the first motor 110 can be obtained by a sensor, for example, the rotation speed of the first motor 110 can be used to determine the displacement factor; the discharge pressure of the plunger pump 200 can be obtained by a pressure sensor, for example, the discharge pressure of the plunger pump 200 can be used to determine a displacement factor correction coefficient, which is not limited by the embodiments of the present disclosure.

In the step S130, for example, in some examples, the real-time displacement of the plunger pump 200 is adjusted based on the rotation speed of the first motor 110 and the discharge pressure of the plunger pump 200.

Figure 3:
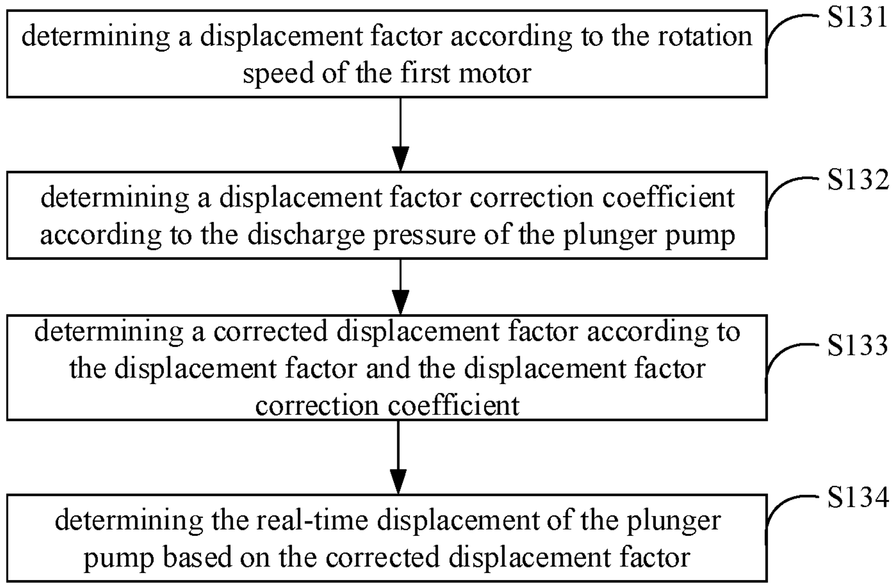
FIG. 3 is a flowchart of a method for adjusting a real-time displacement of a plunger pump provided by at least one embodiment of the present disclosure.

FIG. 3 is a flowchart of a method for adjusting the real-time displacement of the plunger pump provided by at least one embodiment of the present disclosure. That is, FIG. 3 is a flowchart of an example of the step S130 illustrated in FIG. 2. For example, as shown in FIG. 3, the method for adjusting the real-time displacement of the plunger pump includes steps S131 to S134.

Step S131: determining the displacement factor according to the rotation speed of the first motor.

Step S132: determining the displacement factor correction coefficient according to the discharge pressure of the plunger pump.

Step S133: determining a corrected displacement factor according to the displacement factor and the displacement factor correction coefficient.

Step S134: determining the real-time displacement of the plunger pump based on the corrected displacement factor.

Corresponding to step S131, for example, the displacement factor may be determined based on the relationship between the rotation speed of the first motor 110 and the displacement of the first motor 110. For example, the determination method may adopt relevant methods in the field, and is not described in detail here.

For the step S132, for example, a correspondence relationship between the discharge pressure of the plunger pump 200 and the displacement factor correction coefficient is stored in a look-up table. For example, the step of determining the displacement factor correction coefficient according to the discharge pressure of the plunger pump 200 includes: searching the displacement factor correction coefficient corresponding to the discharge pressure of the plunger pump 200 in the look-up table. For example, by the discharge pressure of the plunger pump 200 measured by the pressure sensor in real time, the displacement factor correction coefficient is searched in the look-up table in real time.

For the step S133, for example, in some examples, the corrected displacement factor may be obtained by multiplying the displacement factor correction coefficient with the displacement factor. Of course, the corrected displacement factor may also be determined by other methods in the field, which is not limited by the embodiments of the present disclosure.

For the step S134, for example, in some examples, the real-time displacement of the plunger pump 200 is determined based on the corrected displacement factor and is adjusted. The method for determining the real-time displacement may be by the calculation method in the art, which is not described in detail here, and the embodiments of the present disclosure impose no limitation to this case.

In the embodiments of the present disclosure, the actual displacement and the theoretical displacement of the plunger pump 200 may be different according to different discharge pressures. Therefore, the control device performs curve fitting according to a relationship between the discharge pressure and a theoretical pump efficiency (for example, the theoretical displacement) of the plunger pump, and then corrects the displacement of the plunger pump in real time according to the current discharge pressure (i.e., correcting the pump efficiency), thus ensuring the metering accuracy and improving the metering accuracy of pump efficiency calculation.

For the step S140, for example, upon the real-time displacement of the plunger pump 200 reaching the preset displacement, the first motor 110 is kept in a stable operation state. For example, the stable operation state can be a stable operation state in which the preset displacement is reached at a fixed rotation speed, for example, the fixed rotation speed is the rotation speed corresponding to the preset displacement, which is not limited to this case in the embodiments of the present disclosure.

Figure 4A:
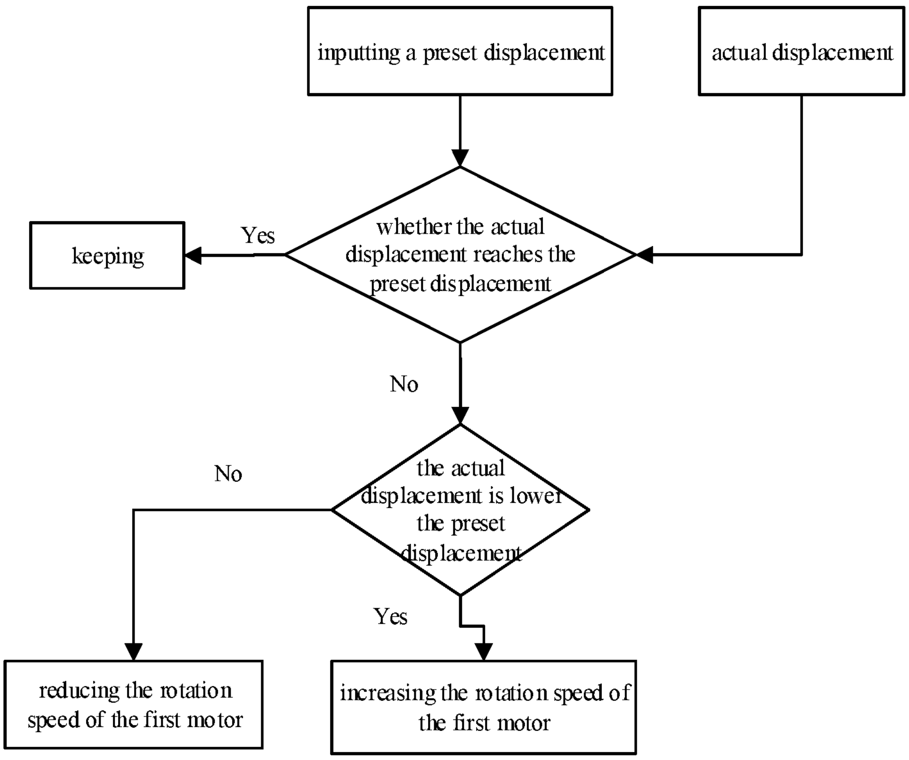
FIG. 4A is a flowchart of a method for controlling automatic operation of a first motor based on a displacement provided by at least one embodiment of the present disclosure.

FIG. 4A is a flowchart of a method for controlling automatic operation of a first motor based on a displacement provided by at least one embodiment of the present disclosure. For example, as illustrated in FIG. 4A, the actual displacement (i.e., the real-time displacement obtained in real time in the step S130) is compared with the input preset displacement, and upon the actual displacement reaching the preset displacement, the first motor 110 is kept in the operation state at the current speed. If the actual displacement does not reach the preset displacement, judging whether the actual displacement is lower than the preset displacement, and if the actual displacement is lower than the preset displacement, the rotation speed of the first motor is increased to correspondingly increase the actual displacement; and if the actual displacement is not lower than the preset displacement, the rotation speed of the first motor is reduced to correspondingly reduce the actual displacement.

Figure 4B:
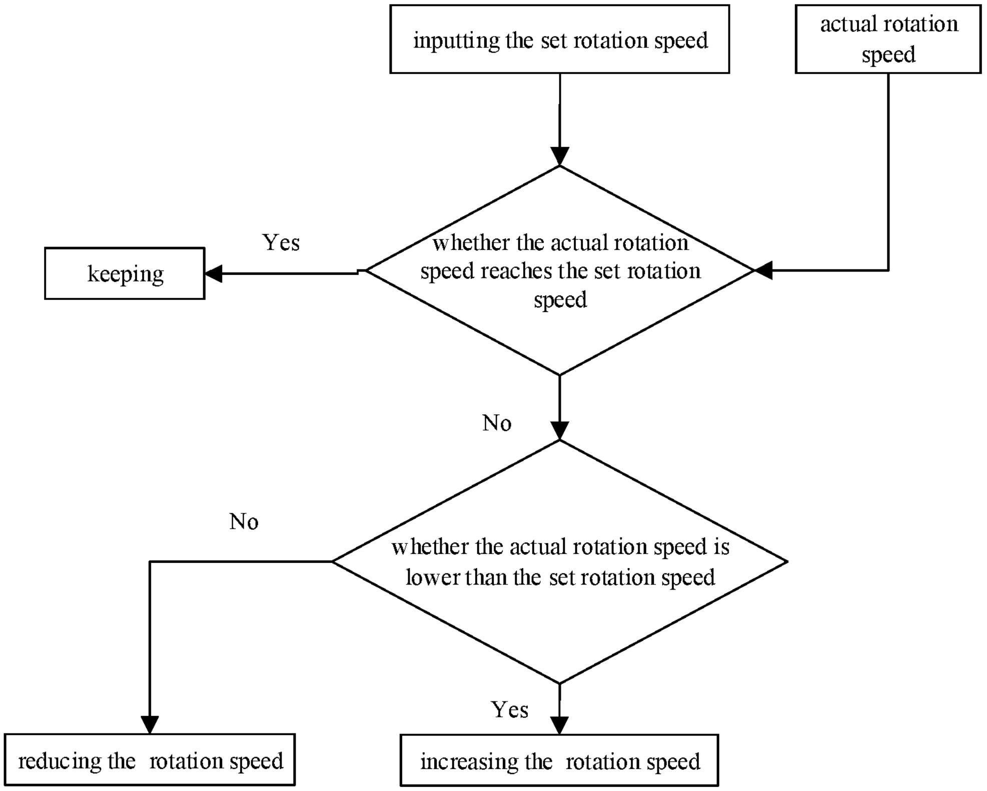
FIG. 4B is a flowchart of a method for controlling the automatic operation of the first motor based on a rotation speed provided by at least one embodiment of the present disclosure.

For example, in other examples, the operation of the first motor may be controlled by the rotation speed. FIG. 4B is a flowchart of a method for controlling automatic operation of the first motor based on a rotation speed provided by at least one embodiment of the present disclosure. For example, as shown in FIG. 4B, the actual rotation speed (for example, obtained by a sensor) is compared with the input set rotation speed, and upon the actual rotation speed reaching the set rotation speed, the first motor 110 is kept in the operation state at the current rotation speed. If the actual rotation speed does not reach the set rotation speed, judging whether the actual rotation speed is lower than the set rotation speed, and if the actual rotation speed is lower than the set rotation speed, the rotation speed of the first motor is increased; and if the actual rotation speed is not lower than the set rotation speed, the rotation speed of the first motor is reduced.

For example, in other examples, the electric fracturing apparatus 100 further includes a second motor 120. For example, the second motor 120 is an auxiliary motor configured to drive the auxiliary system of the first motor 110 and the plunger pump 200. For example, the auxiliary system includes the heat dissipation system of the first motor 110 or the lubrication system of the plunger pump 200 or the lubrication oil heat dissipation system of the plunger pump 200. For example, the second motor 120 includes a high and low pressure lubrication oil pump motor configured to lubricate the plunger pump 200 (for example, the high and low pressure lubrication oil pump motor include a high pressure oil pump motor and a low pressure oil pump motor, which are not shown in the figure), an oil dispersion motor (not shown in the figure) configured to dissipate heat from the lubrication oil (such as the hydraulic oil) and a heat dissipation fan (not shown in the figure) configured to dissipate heat from the first motor 110.

For example, the heat dissipation fan is provided on the first motor 110 to drive the heat dissipation system in the auxiliary system to dissipate heat from the winding of the first motor. The high pressure oil pump motor is configured to drive the lubrication system in the auxiliary system to lubricate a crankcase of the plunger pump 200, and the low pressure oil pump motor is configured to drive the lubrication system in the auxiliary system to lubricate a gear box in the plunger pump 200; the oil dispersion motor is configured to drive the lubrication oil heat dissipation system to dissipate the heat of the hydraulic oil, etc.

For example, the control method further includes: in response to start or stop of the first motor 110, allowing the second motor 120 to be automatically started or stopped, and automatically controlling the second motor 120 to run in a stable state after the second motor is automatically started. For example, the second motor 120 is started in response to the start of the first motor 110, and is automatically controlled to run in the stable state; the second motor 120 is stopped in response to the stop of the first motor 110.

For example, the second motor (responding to the start or stop of the first motor) can be automatically controlled according to the start and stop of the first motor under the linkage control function, and the control principle is as follows: in the case where the first motor is started, after pressing the first motor start button, the heat dissipation fan, the oil dispersion motor and the high and low pressure lubrication oil pump motor are automatically started and run in a stable state by the automatic control system (the term "stable state" refers to parameters such as oil pressure controlled by the high and low pressure lubrication oil pump motor and oil temperature controlled by the oil dispersion motor are stable at the input set reference values). For example, in some examples, the set pressure (that is, a set input parameter value) of the high and low pressure lubrication oil pump motor is 0.4 MPa, and if the measured value of oil pressure is stable at 0.4 MPa at this time, it is considered to be in a stable state.

Figure 5:
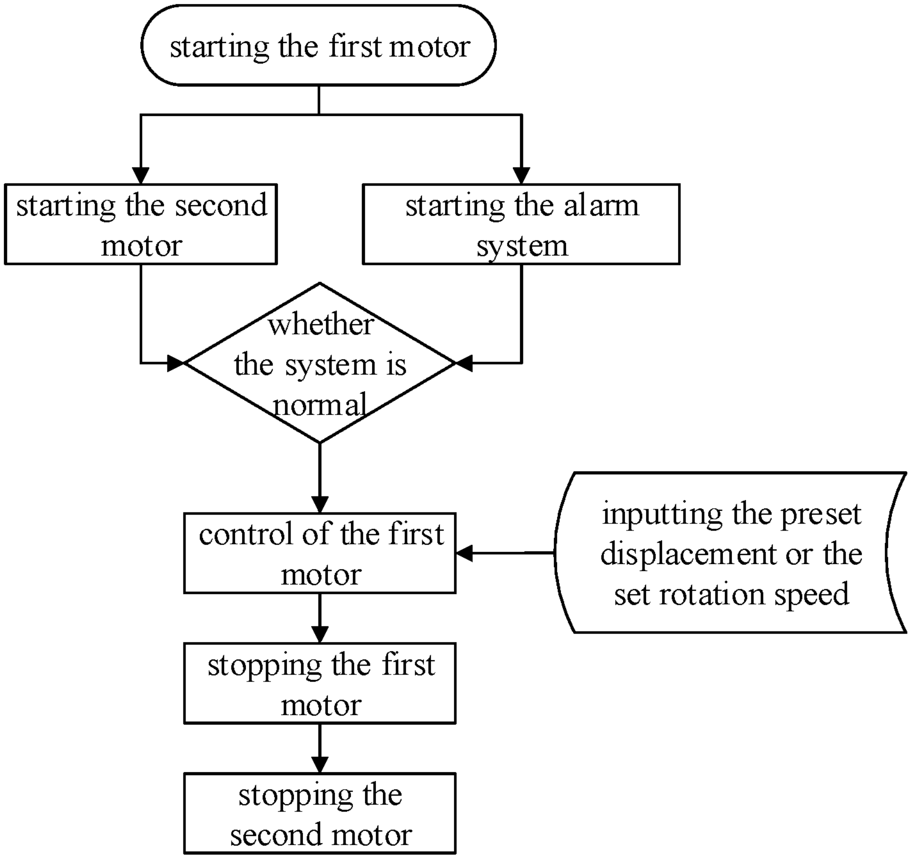
FIG. 5 is a flowchart of another control method provided by at least one embodiment of the present disclosure.

FIG. 5 is a flowchart of another control method provided by at least one embodiment of the present disclosure. For example, as shown in FIG. 5, after the user presses a start button of the first motor 110 to start, the second motor 120 and the alarm system (which will be described in detail below) are started. The second motor 120 is configured to control the motors of the auxiliary system, such as the high and low pressure lubrication oil pump motor, the heat dissipation fan of the first motor and the oil dispersion motor for controlling the temperature of the hydraulic oil to operate in a reasonable state, the alarm system detects the operation parameters of the first motor, a variable frequency skid and the plunger pump, etc., and gives an alarm signal in the case where the operation parameters are abnormal. In the case where the first motor, the second motor and the plunger pump work normally, the control of the first motor can be performed, for example, the displacement control as shown in FIG. 4A or the rotation speed control as shown in FIG. 4B, that is, the preset displacement or the set rotation speed are input for corresponding control. In the case where the work is completed and the user presses a stop button of the first motor 110 to stop the operation of the first motor 110, the operation of the second motor 120 is automatically stopped. In the embodiment of the present disclosure, the second motor 120 can be started and stopped in response to the start and stop of the first motor, thereby avoiding separately manually controlling the start and stop of the first motor and the second motor, realizing automatic control of the electric drive fracturing equipment, and greatly saving manpower and material resources.

Figure 6:
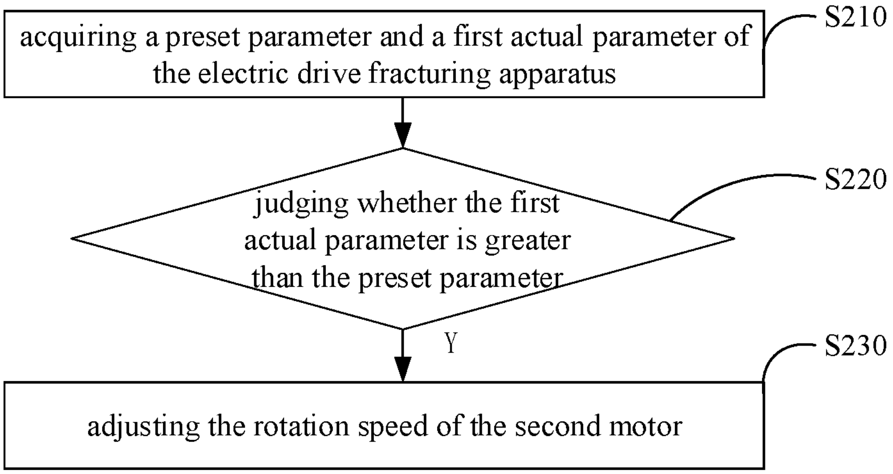
FIG. 6 is a flowchart of automatic control of a second motor after being started provided by at least one embodiment of the present disclosure.

FIG. 6 is a flowchart of automatic control of the second motor after being started provided by at least one embodiment of the present disclosure. As shown in FIG. 6, the automatic control process of the second motor includes steps S210 to S230.

Step S210: acquiring a preset parameter and a first actual parameter of the electric fracturing apparatus.

For example, the preset parameter is the input set parameter value above. For example, the preset parameters of different second motors may be set according to actual needs, so they are not described in detail here. For example, in the case where the second motor is the oil dispersion fan, the preset parameter may be a preset oil temperature to be reached by the oil dispersion fan; in the case where the second motor is the high and low pressure lubrication oil pump motor, the preset parameter may be a preset oil pressure to be reached by the high and low pressure lubrication oil pump motor, which is not limited by the embodiments of the present disclosure. For example, the preset oil temperature and the preset oil pressure may be determined according to actual conditions, and embodiments of the present disclosure impose no limitation to this case.

For example, the first actual parameter may be acquired by a sensor or other acquisition device, which is not limited by embodiments of the present disclosure.

Step S220: judging whether the first actual parameter is greater than the preset parameter, in which if the first actual parameter is greater than the preset parameter, the S230 is performed.

For example, upon the first actual parameter obtained in real time reaching the preset parameter, the second motor is kept in a stable operation state, and in the case where the first actual parameter is greater than the preset parameter, the rotation speed of the second motor is adjusted.

Step S230: adjusting the rotation speed of the second motor.

For example, the rotation speed of the second motor can be adjusted by increasing or decreasing the rotation speed of the second motor.

Figure 7:
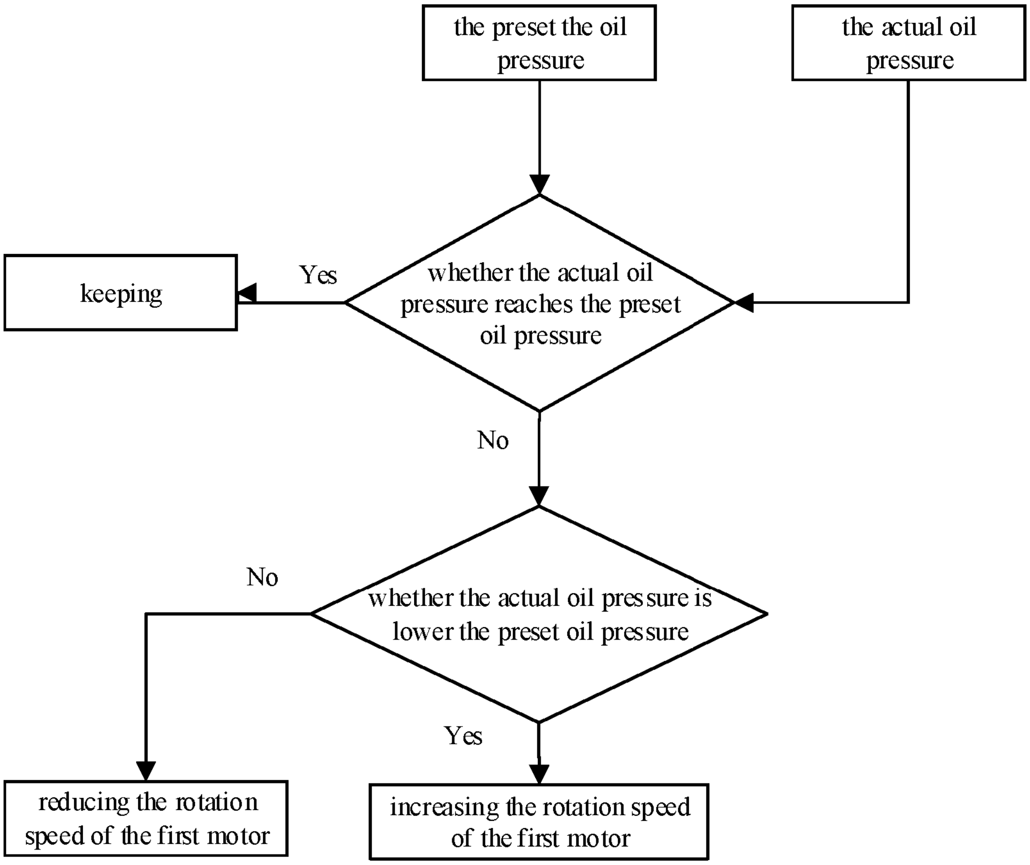
FIG. 7 is a flowchart of automatic control of a high and low pressure lubrication oil pump motor provided by at least one embodiment of the present disclosure.

FIG. 7 is an automatic control flowchart of automatic control of a high and low pressure lubrication oil pump motor provided by at least one embodiment of the present disclosure.

For example, as shown in FIG. 7, in the case where the high and low pressure lubrication oil pump motor is started in response to the start of the first motor 110, a preset oil pressure (i.e., the preset parameter, i.e., the input set parameter value) and an actual oil pressure (i.e., a first actual parameter) of the high and low pressure lubrication oil pump motor are acquired. For example, the preset oil pressure (that is, the input set parameter value) of the high and low pressure lubrication oil pump motor is 0.4 MPa, and the specific value can be determined according to actual needs, which is not limited by the embodiments of the present disclosure. For example, the actual oil pressure can be obtained in real time according to the pressure sensor, which is not limited by the embodiments of the present disclosure.

Then, it is judged whether the actual oil pressure reaches the preset oil pressure, and if the actual oil pressure reaches the preset oil pressure, it is kept in a stable state. For example, the high and low pressure lubrication oil pump motor (i.e., the second motor 120) keeps operating stably at the rotation speed of the high and low pressure lubrication oil pump motor corresponding to the current oil pressure. For example, if the measured oil pressure reaches 0.4 MPa at this time, it is considered to be in a stable state.

For example, it is judged whether the actual oil pressure is lower than the preset oil pressure; if the actual oil pressure is lower than the preset oil pressure, the rotation speed of the high and low pressure lubrication oil pump motor is increased; if the actual oil pressure is not lower than the preset oil pressure, the rotation speed of the high and low pressure lubrication oil pump motor is reduced, so as to adjust the rotation speed of the second motor (for example, in this example, the second motor is the high and low pressure lubrication oil pump motor).

Figure 8:
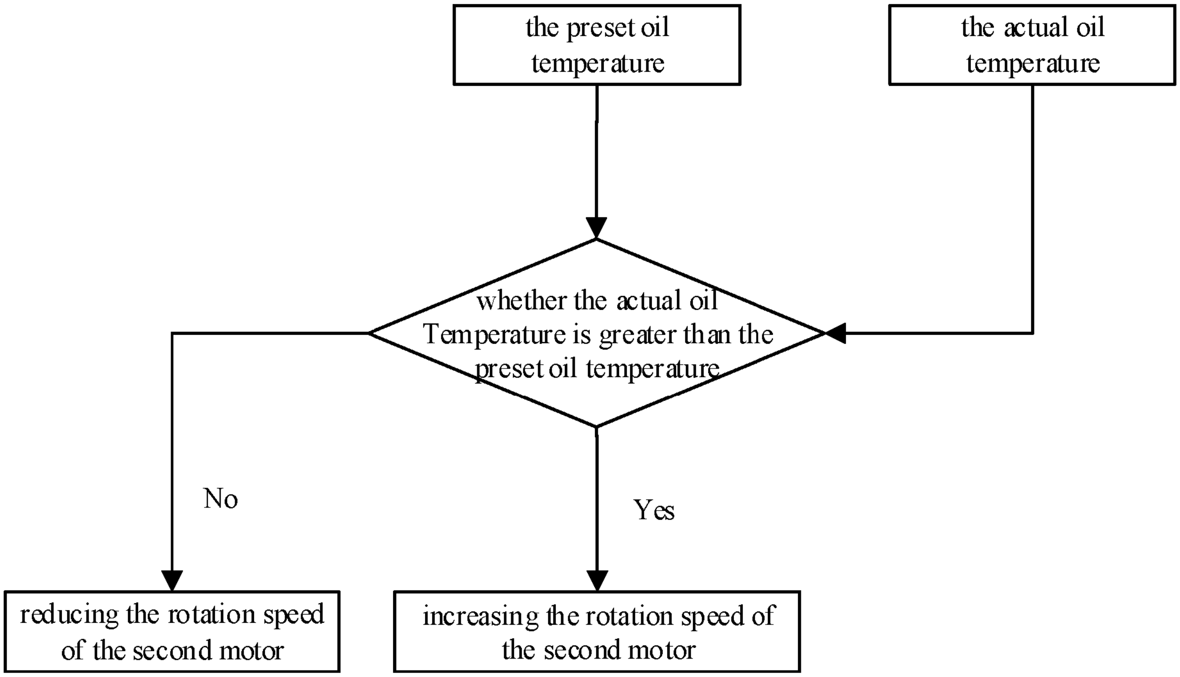
FIG. 8 is a flowchart of automatic control of an oil dispersion motor provided by at least one embodiment of the present disclosure.

FIG. 8 is an automatic control flowchart of the oil dispersion motor provided by at least one embodiment of the present disclosure. For example, the oil dispersion motor is configured to dissipate heat for the hydraulic oil (for example, the hydraulic oil can be used to lubricate the plunger pump), and the rotation speed of the oil dispersion motor is automatically controlled at a reasonable level according to the temperature of the hydraulic oil. The higher the rotation speed of the oil dispersion motor is, the better the heat dissipation effect is, and the lower the temperature after heat dissipation for the hydraulic oil (i.e., the temperature of a lower outlet) is, so that the temperature of the hydraulic oil can be guaranteed not to exceed the alarm limit value by adjusting the rotation speed of the oil dispersion motor.

For example, as shown in FIG. 8, in the case where the oil dispersion motor is started in response to the start of the first motor 110, the preset oil temperature (i.e., the preset parameter, i.e., the input set parameter value) and an actual oil temperature (i.e., the first actual parameter) of the oil dispersion motor are acquired. For example, the specific value of the preset oil temperature of the oil dispersion motor can be determined according to actual needs, which is not limited by the embodiments of the present disclosure. For example, the actual oil temperature can be obtained in real time according to a temperature sensor, which is not limited by embodiments of the present disclosure.

Then, it is judged whether the actual oil temperature reaches the preset oil temperature, and if the actual oil temperature reaches the preset oil temperature, it is kept in a stable state, for example, the oil dispersion motor keeps operating stably at the rotation speed of the oil dispersion motor corresponding to the current oil temperature.

For example, it is judged whether the actual oil temperature is higher than the preset oil temperature; if the actual oil temperature is higher than the preset oil temperature, the rotation speed of the oil dispersion motor is increased; if the actual oil temperature is not higher than the preset oil temperature, the rotation speed of the oil dispersion motor is reduced, so as to adjust the rotation speed of the second motor (for example, in this example, the second motor is the oil dispersion motor).

For example, in other examples, the control method further includes: optimizing a lubrication duration of the plunger pump 200. For example, the lubrication duration of plunger pump can be set by the following two modes. For example, the first method is a fixed-time lubrication method of for example, after lubricating for A second(s), stopping for B second(s), and circulating in turn.

For example, in this example, the step of optimizing the lubrication duration of the plunger pump includes: setting the lubrication duration (A second(s)) and a non-lubrication duration (B second(s)); after continuously lubricating the plunger pump for the lubrication duration (A second(s)), stopping lubricating the plunge pump for the non-lubricating time (B second(s)), which is circulated in turn. For example, A and B are both natural numbers greater than 0.

For example, the second mode is a lubrication mode with a fixed number of strokes (i.e., fixed pulses). For example, in this example, the step of optimizing the lubrication duration of the plunger pump includes: setting a lubrication pulse number (e.g., A) and a non-lubrication pulse number (e.g., B); after continuously lubricating the plunger pump for the lubrication pulse number (A), stopping lubricating the plunger pump for the non-lubrication pulse number (B), which is circulated in turn. That is, after lubricating for A strokes, the lubricating is stopped for B strokes, and which is circulated in turn. For example, one stroke is a round trip, which can be understood as one pulse. The second method can control the lubrication speed, for example, after lubricating for 10 times, the lubricating is stopped for 20 times and then the next 10 times is lubricated, and then circulate in turn.

In this example, more lubrication can be done in the case that the lubrication stroke is fast, and less lubrication can be done in the case that the lubrication stroke is slow, thus avoiding the consequences of different usage of the lubrication oil if the lubrication stroke is different in the first mode (i.e. under the condition of the fixed lubrication duration), thus reducing the usage of the lubrication oil and optimizing the lubrication effect.

Figure 9:
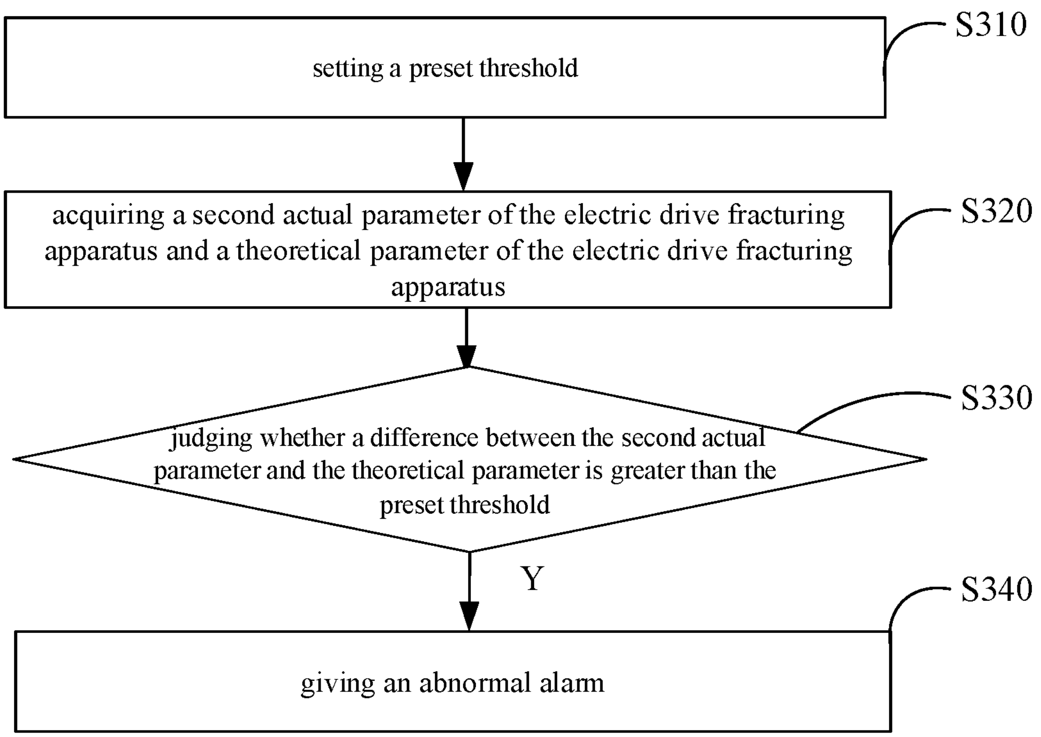
FIG. 9 is a flowchart of an abnormal alarm provided by at least one embodiment of the present disclosure.

For example, in other examples, the control method further includes optimizing an alarm system. FIG. 9 is a flowchart of an abnormal alarm provided by at least one embodiment of the present disclosure. As shown in FIG. 9, the abnormal alarm method includes step S310 and step S340.

Step S310: setting a preset threshold.

For example, the preset threshold may be determined according to the actual situation, which is not limited by embodiments of the present disclosure.

Step S320: acquiring a second actual parameter of the electric fracturing apparatus and a theoretical parameter of the electric fracturing apparatus.

For example, the second actual parameter can be read out by a frequency converter, etc., and the theoretical parameter can be calculated by the parameter obtained by the sensor. The specific calculation method can refer to the introduction in the following specific embodiment.

Step S330: judging whether a difference between the second actual parameter and the theoretical parameter is greater than the preset threshold, in which if the second actual parameter and the theoretical parameter is greater than the preset threshold, the step 340 is performed.

For example, if the difference between the second actual parameter and the theoretical parameter is greater than the preset threshold, it indicates that an abnormality occurs, and an alarm is given.

Step S340: giving an abnormal alarm.

For example, the abnormal alarm can be realized by a buzzer, an alarm indicator light or other designs in the art.

For example, in some examples, the second actual parameter and the theoretical parameter may be respectively the actual power of the first motor and the theoretical power of the first motor, or may be respectively the actual temperature of the winding of the first motor and the theoretical temperature of the winding of the first motor, or may be respectively the actual discharge pressure of the plunger pump and the theoretical discharge pressure of the plunger pump, or may be respectively the actual power of the second motor and the theoretical power of the second motor, or may be respectively the actual displacement of the plunger pump and the theoretical displacement of the plunger pump.

Figure 10:
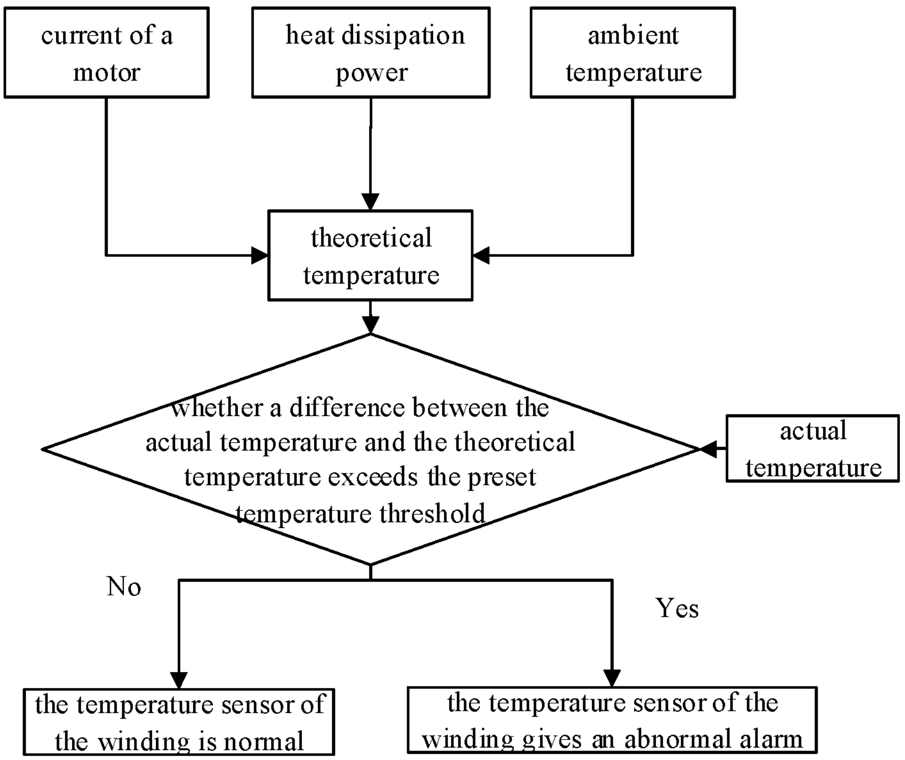
FIG. 10 is a flowchart of a method for judging an abnormal alarm of a winding of the first motor provided by at least one embodiment of the present disclosure.

FIG. 10 is a flowchart of a method for judging an abnormal alarm of a winding of the first motor provided by at least one embodiment of the present disclosure.

For example, as shown in FIG. 10, in the case where judging whether the winding of the first motor is abnormal, the above abnormal alarm method may include: setting a preset temperature threshold as the preset threshold; acquiring an actual temperature and a theoretical temperature of the winding of the first motor; judging whether a difference between the actual temperature and the theoretical temperature exceeds the preset temperature threshold; if the difference between the actual temperature and the theoretical temperature exceeds the preset temperature threshold, an abnormal alarm is given.

For example, as shown in FIG. 10, in the case where the second motor includes the heat dissipation fan, the theoretical temperature of the winding of the first motor can be obtained based on a current of the first motor, an ambient temperature and a heat dissipation power of the heat dissipation fan. For example, the actual temperature of the winding of the first motor can be read out by a frequency converter connected with the first motor, and the theoretical temperature can be calculated based on the current of the first motor, the ambient temperature and the heat dissipation power of the heat dissipation fan, which is not limited to this case by the embodiments of the present disclosure.

For example, if the difference between the actual temperature and the theoretical temperature exceeds the preset temperature threshold, the temperature sensor of the winding of the first motor gives an abnormal alarm; if the difference between the actual temperature and the theoretical temperature does not exceed the preset temperature threshold, it means that the temperature sensor of the winding of the first motor is normal.

For example, in some examples, the theoretical discharge pressure borne by the plunger pump in this case may also be calculated by a torque of the first motor (high-pressure liquid work), and an alarm signal is given in the case that the calculated actual discharge pressure is too large, so as to prevent the plunger from being damaged due to excessive plunger pressure caused by sand accumulation inside the plunger. For example, sand may be blocked in the plunger pump, and the abnormal alarm can prevent the plunger pump from being damaged in the case that the liquid pressure sensor is inaccurate or cannot measure the liquid pressure.

For example, in this example, the method of judging the abnormal alarm of the pressure sensor of the plunger pump specifically includes: setting a preset threshold of the discharge pressure of the plunger pump as the preset threshold; acquiring the actual discharge pressure (for example, acquired by the frequency converter) and the theoretical discharge pressure of the plunger pump (for example, acquiring the theoretical discharge pressure of the plunger pump based on the torque of the first motor); judging whether the difference between the actual pressure and the theoretical pressure is greater than the preset threshold of the discharge pressure; if the difference between the actual pressure and the theoretical pressure is greater than the preset threshold of the discharge pressure, the pressure sensor of the plunger pump gives an abnormal alarm; if the difference between the actual pressure and the theoretical pressure is less than the preset threshold of the discharge pressure, it means that the pressure sensor is normal.

Figure 11:
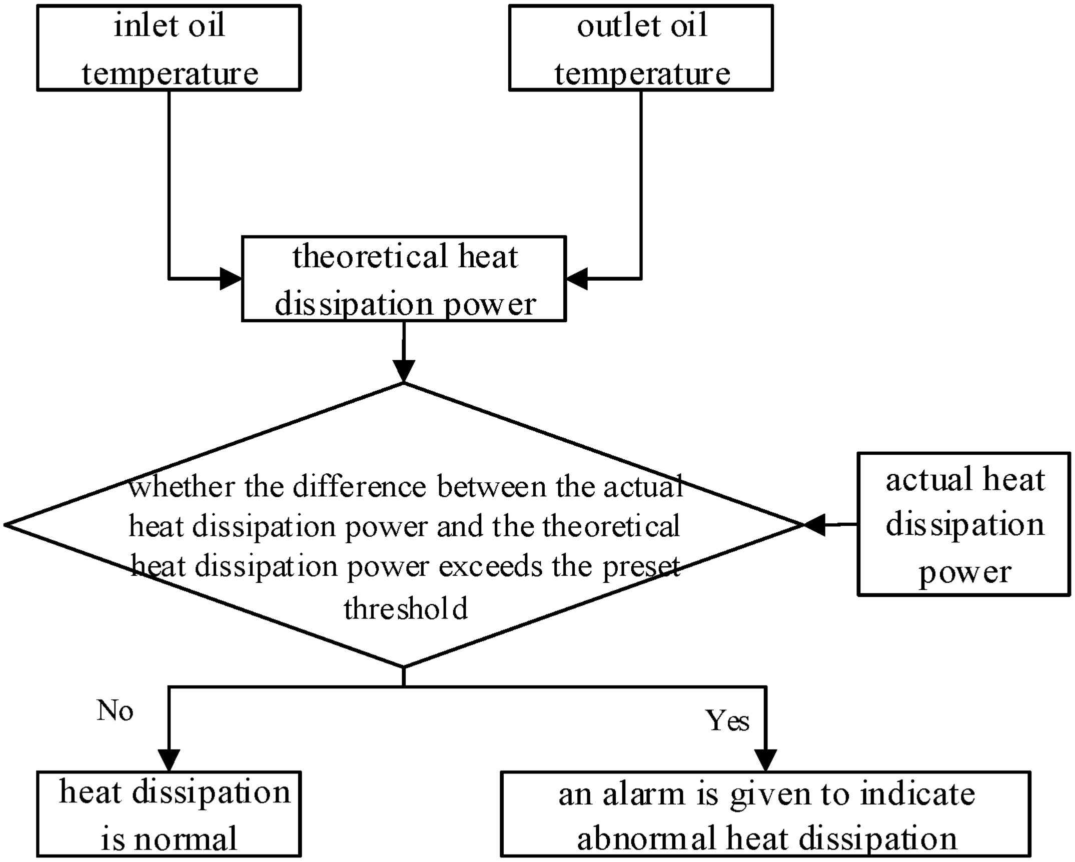
FIG. 11 is a flowchart of a method for judging an abnormal alarm of an oil dispersion motor provided by at least one embodiment of the present disclosure.

FIG. 11 is a flowchart of a method for judging an abnormal alarm of the oil dispersion motor provided by at least one embodiment of the present disclosure.

For example, as shown in FIG. 11, in the case where judging whether the oil dispersion motor (configured to dissipate heat from the hydraulic oil, and the hydraulic oil can be used as lubrication oil for lubricating the plunger pump, for example) is abnormal, the above-mentioned method of the abnormal alarm may include: acquiring an inlet oil temperature (the oil temperature at the inlet) and an outlet oil temperature (the oil temperature at the outlet) of the hydraulic oil; and acquiring a theoretical heat dissipation power as the theoretical parameter based on the inlet oil temperature of the hydraulic oil and the outlet oil temperature of the hydraulic oil. For example, the inlet oil temperature and the outlet oil temperature can be measured by a temperature sensor.

For example, according to the difference between a suction temperature (i.e., the inlet oil temperature, for example, oil temperature at the oil inlet is higher) of the hydraulic oil and a discharge temperature (i.e., the outlet oil temperature, for example, because of the heat dissipation of the oil dispersion motor, the oil temperature at the oil outlet is lower) of the hydraulic oil (e.g., lubrication oil used for lubricating the plunger pump), the theoretical heat dissipation power of the oil dispersion motor is calculated as a theoretical parameter, and is compared with the actual heat dissipation power of the oil dispersion motor (obtained by a frequency converter, i.e., as a second actual parameter), in the case that a difference between the actual heat dissipation power and the theoretical heat dissipation power is large, it is judged by the system that the heat dissipation is abnormal and an alarm is given. For example, in the case that there is foreign matter in the oil path causing blockage, a reduction of oil path displacement, or a fault of the oil dispersion motor, the abnormality of the oil dispersion motor is caused.

Figure 12:
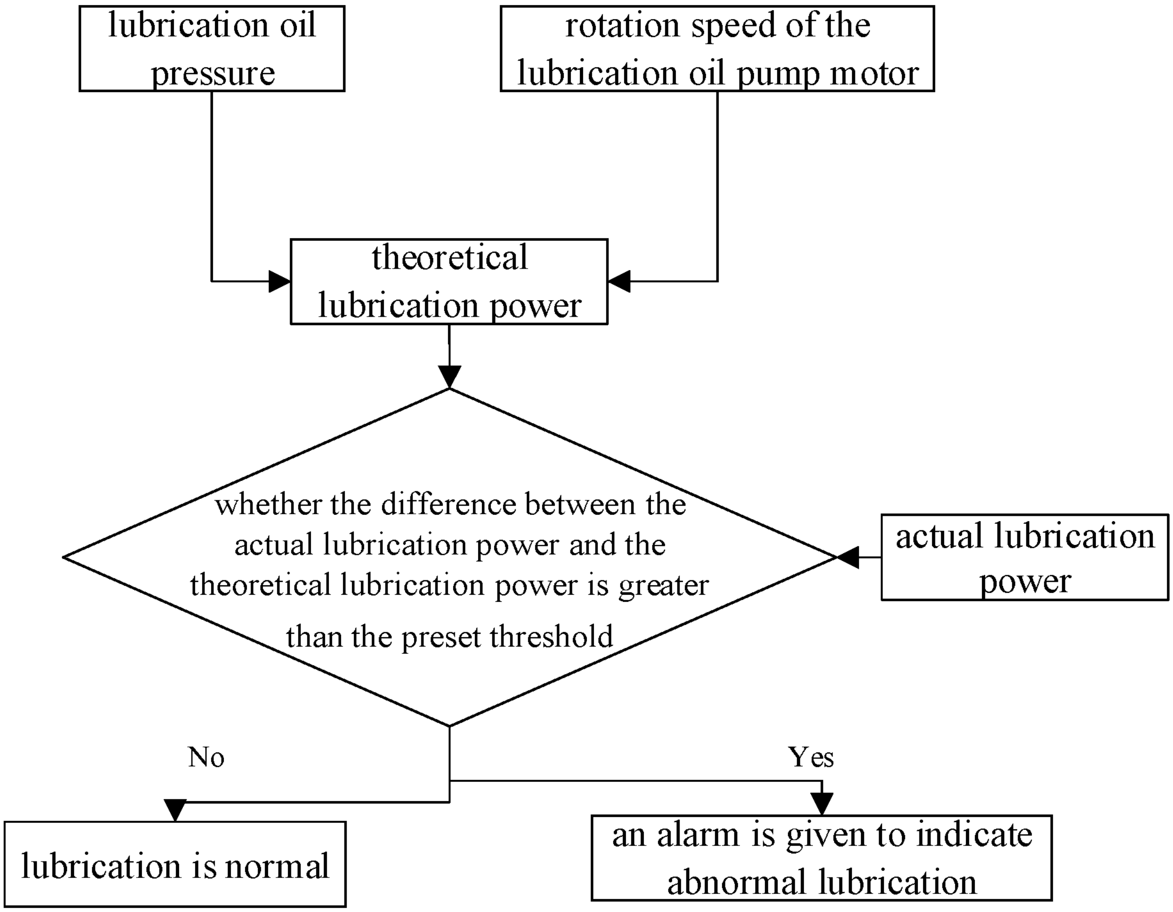
FIG. 12 is a flowchart of a method for judging an abnormal alarm of the high and low pressure lubrication oil pump motor provided by at least one embodiment of the present disclosure.

FIG. 12 is a flowchart of a method for judging an abnormal alarm of the high and low pressure lubrication oil pump motor provided by at least one embodiment of the present disclosure.

For example, as shown in FIG. 12, for example, in the case that the second motor includes the high and low pressure lubrication oil pump motor (configured to lubricate the plunger pump), that is, in the case that it is judged whether the high and low pressure lubrication oil pump motor is abnormal, acquiring the theoretical power of the second motor includes: obtaining a lubrication oil pressure of the plunger pump and a rotation speed of the high and low pressure lubrication oil pump motor; acquiring a theoretical lubrication power as the theoretical parameter based on the lubrication oil pressure of plunger pump and the rotation speed of the high and low pressure lubrication oil pump motor. For example, the high pressure lubrication oil pump motor and the low pressure lubrication oil pump motor can respectively perform the above abnormal alarm operation.

For example, a theoretical lubrication power of the high and low pressure lubrication oil pump motor is calculated as the theoretical parameter, and an actual lubrication power of the high and low pressure lubrication oil pump motor is acquired by reading the frequency converter as the second actual parameter. In the case where a difference between the two is larger, that is, greater than the preset threshold, a system alarm is given to indicate abnormal lubrication.

Figure 13:
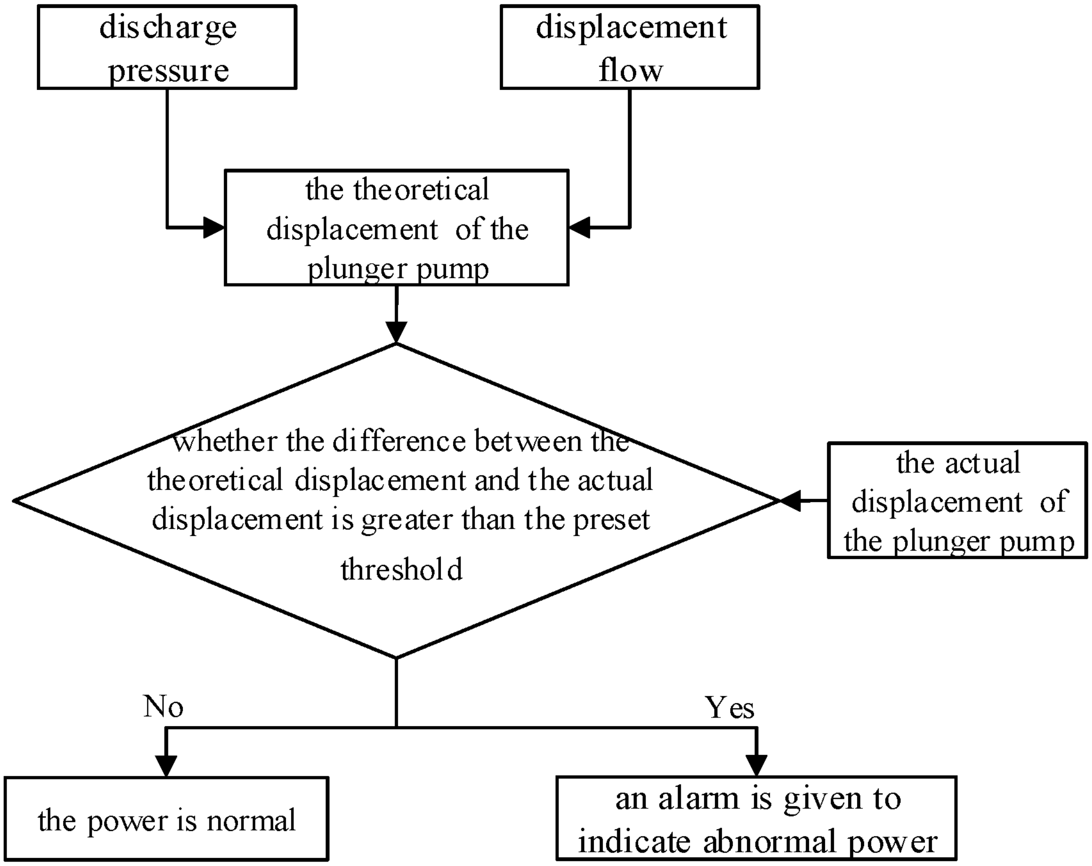
FIG. 13 is a flowchart of a method for judging an abnormal power alarm of the first motor provided by at least one embodiment of the present disclosure.

FIG. 13 is a flowchart of a method for judging an abnormal power alarm of the first motor provided by at least one embodiment of the present disclosure.

For example, as shown in FIG. 13, the theoretical power of the first motor is calculated as the theoretical parameter by the displacement of the plunger pump, the discharge pressure of the plunger pump and the displacement factor of the plunger pump, and the actual power of the first motor is obtained by the frequency converter as the second actual parameter, and an alarm is given in the case that the difference between the theoretical parameter and the second actual parameter is large, it is indicated that the power of the first motor is abnormal.

Figure 14:
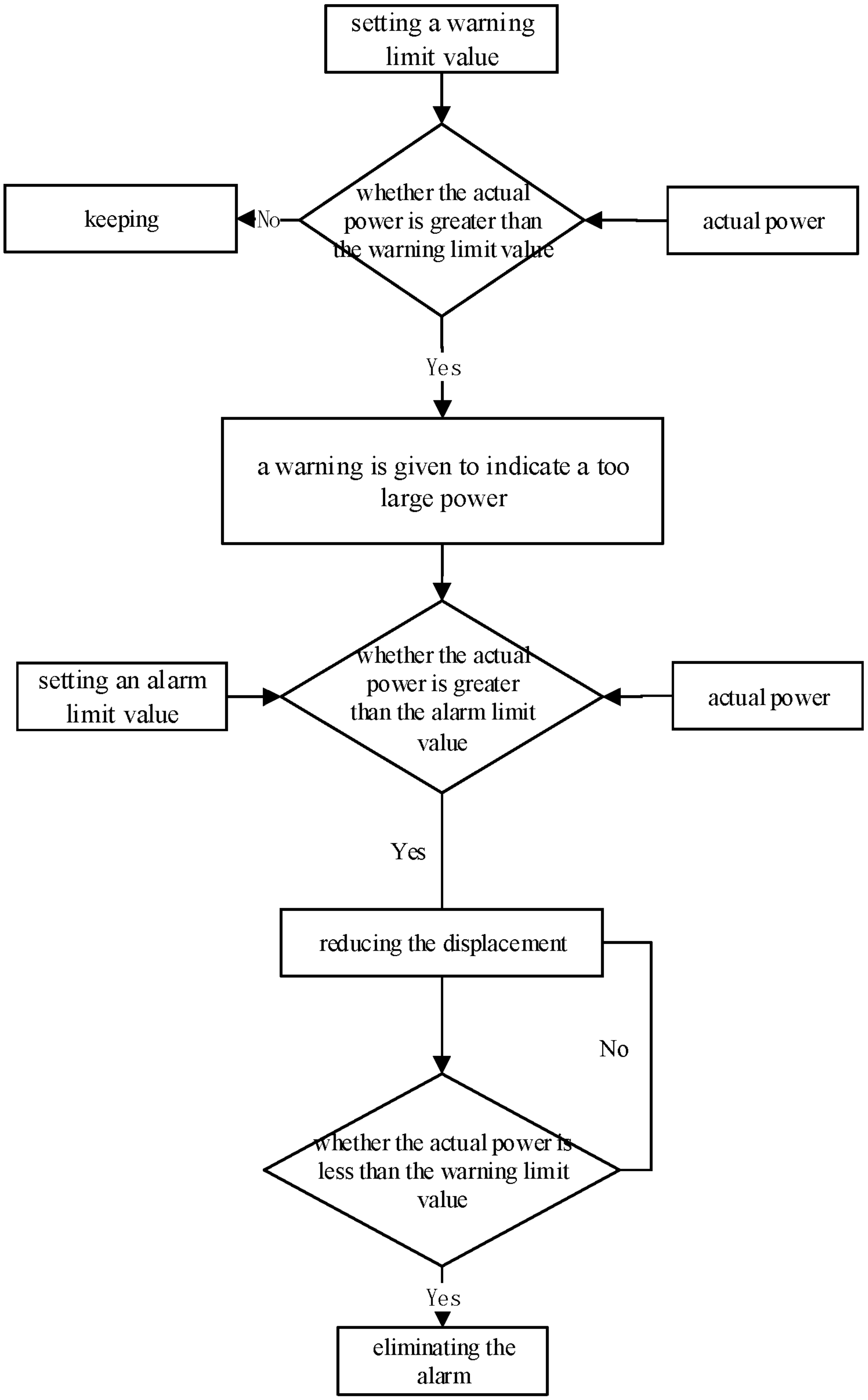
FIG. 14 is a flowchart of an optimization method of motor power limitation provided by at least one embodiment of the present disclosure.

For example, in some embodiments of the present disclosure, the control method further includes an optimization method of the motor power limitation. FIG. 14 is a flowchart of an optimization method of the motor power limitation provided by at least one embodiment of the present disclosure. For example, as shown in FIG. 14, the optimization method includes: acquiring a warning limit value of each motor of the electric fracturing apparatus and an alarm limit value of each motor of the electric fracturing apparatus; judging whether an actual power of the respective motor is greater than the warning limit value, in which if the actual power of the respective motor is greater than the warning limit value, a warning is given; judging whether the actual power of the respective motor is greater than the alarm limit value, in which if the actual power is greater than the alarm limit value, the rotation speed of the respective motor is reduced, so that the actual power of the respective motor is lower than the warning limit value.

For example, as shown in FIG. 14, first the warning limit value and the alarm limit value are set, and the control device obtains the set warning limit value and the actual power of each motor, and judges whether the actual power of the respective motor is greater than the warning limit value, if not, the current operation state is kept, and if yes, a warning of excessive power is sent out, and the alarm limit value is obtained by the control device to judge whether the actual power is greater than the alarm limit value, if yes, the displacement is reduced, and then the control device continue to judge whether the actual power of the motor is lower than the warning limit value, if yes, the alarm is eliminated, and if not, the displacement is continuously to be reduced until the actual power is lower than the warning limit value.

For example, the control method sets the maximum alarm limit value of each motor power, and in the case where the actual power exceeds the warning limit value, the control system gives an alarm prompt to remind the user to pay attention to the operation power. In the case that the actual power exceeds the warning limit value, the apparatus actively reduces the displacement and drops below the warning limit value, to prevent the normal operation of the electric fracturing apparatus from being affected by power failure after protection of well safety equipment due to an excessive power.

It should be noted that in the embodiments of this disclosure, the flow of the control method provided by the above embodiments of this disclosure may include more or less operations, and these operations may be executed sequentially or in parallel. Although the flow of the control method described above includes a plurality of operations occurring in a specific order, it should be clearly understood that the order of the plurality of operations is not limited. The above-described control method may be executed once or multiple times according to predetermined conditions.

In the control method provided by the embodiment of the present disclosure, on the one hand, by inputting a preset displacement, the first motor is automatically operated to the preset displacement and then kept at the current rotation speed, so as to achieve a stable operation state, and controlling of the rotation speed of the first motor by the displacement can be better adapted to the operation scene and is more user-friendly; on the other hand, by adjusting the real-time displacement of the plunger pump based on both the rotation speed of the first motor and the discharge pressure of the plunger pump, the displacement of the plunger pump can be corrected in real time, the metering accuracy is ensured, and the accuracy of pump efficiency calculation of the plunger pump is improved.

At least one embodiment of the present disclosure further provides a control device applied to the electric fracturing apparatus. For example, as shown in FIG. 1, the electric fracturing apparatus includes a first motor configured to drive a plunger pump to operate.

For example, the first motor 110 is a main motor which is configured to drive the plunger pump 200 to operate, so as to realize the function of converting the low-pressure liquid into the high-pressure liquid, and realize the displacement control of the plunger pump 200 by controlling the rotation speed of the first motor 110. Pressure sensors are respectively provided at a suction end and a discharge end of the plunger pump 200 to detect a suction pressure and a discharge pressure of the plunger pump 200. The plunger pump 200 is equipped with a lubrication system (not shown in the figure) for lubricating the power part. A lubrication system is equipped with a pressure sensor and a temperature sensor, which send out an alarm signal in the case where the pressure and temperature are abnormal.

Figure 15:
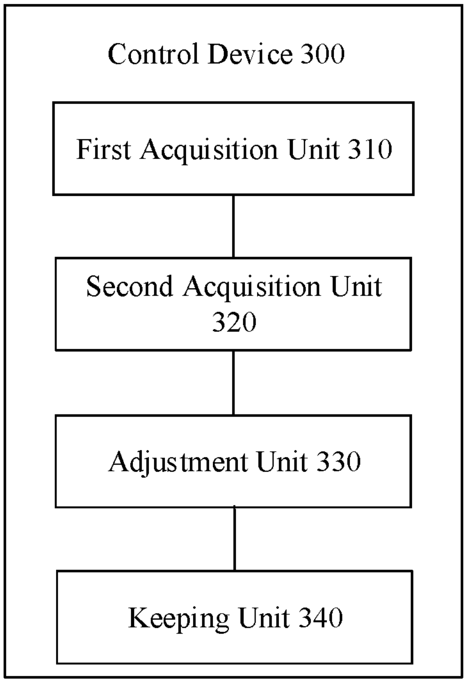
FIG. 15 is a schematic block diagram of a control device provided by at least one embodiment of the present disclosure.

FIG. 15 is a schematic block diagram of the control device provided by at least one embodiment of the present disclosure. For example, in the example shown in FIG. 15, the control device 300 includes a first acquisition unit 310, a second acquisition unit 320, an adjustment unit 330, and a keeping unit 340. For example, these units can be realized by means of hardware (e.g., circuit) modules, software modules and any combination thereof, and the embodiments of the present disclosure are not limited to this case.

The first acquisition unit 310 is configured to acquire a preset displacement of the plunger pump. For example, the first acquisition unit 310 can implement the step S110, and the specific implementation method may be referred to the related description of the step S110, which is not repeated here.

The second acquisition unit 320 is configured to acquire a rotation speed of the first motor and a discharge pressure of the plunger pump; for example, the second acquisition unit 320 can implement the step S120, and the specific implementation method may be referred to the related description of the step S120, which is not repeated here.

The adjustment unit 330 is configured to determine a real-time displacement of the plunger pump based on the rotation speed of the first motor and the discharge pressure of the plunger pump and adjust the real-time displacement. For example, the adjustment unit 330 can implement the step S130, and the specific implementation method may be referred to the related description of the step S130, which is not repeated here.

The keeping unit 340 is configured to keep the first motor in a stable operation state upon the real-time displacement reaching the preset displacement. For example, the keeping unit 340 can implement the step S140, and the specific implementation method may be referred to the related description of step S140, which is not repeated here.

For example, in other examples, as shown in FIG. 1, the electric fracturing apparatus 100 further includes a second motor 120 configured to drive the auxiliary system of the first motor 110 and the plunger pump 200, and is automatically started or stopped in response to the start or stop of the first motor, and is automatically controlled to run in a stable state after being automatically started.

For example, the second motor 120 is an auxiliary motor. For example, the auxiliary system includes a heat dissipation system of the first motor 110 or a lubrication system or a lubrication oil heat dissipation system of the plunger pump 200. For example, the second motor 120 includes a high and low pressure lubrication oil pump motor for lubricating the plunger pump 200 (for example, the high and low pressure lubrication oil pump motors include a high pressure oil pump motor and a low pressure oil pump motor which are not shown in the figure), an oil dispersion motor (not shown in the figure) for dissipating heat from lubrication oil (such as hydraulic oil) and a heat dissipation fan (not shown in the figure) for dissipating heat from the first motor 110.

For example, a heat dissipation fan is installed on the first motor 110 to drive the heat dissipation system in the auxiliary system to dissipate heat from a winding of the first motor. The high pressure oil pump motor is configured to drive the lubrication system in the auxiliary system to lubricate a crankcase of the plunger pump 200, and the low pressure oil pump motor is configured to drive the lubrication system in the auxiliary system to lubricate a gear box in the plunger pump 200; the oil dispersion motor is configured to drive the lubrication oil heat dissipation system to dissipate heat from the hydraulic oil.

It should be noted that, in order to show clearly and concisely, all the components of the control device 300 are not given in the embodiment of this disclosure. To realize the necessary functions of the control device 300, those skilled in the art can provide and set other unillustrated components according to specific needs, which is not limited by the embodiments of the present disclosure.

The related description and technical effects of the control device 300 can refer to the related description and technical effects of the control method provided in the embodiment of this disclosure, and they are not be repeated here.

The following should be noted:

(1) Only the structures involved in the embodiments of the present disclosure are illustrated in the drawings of the embodiments of the present disclosure, and other structures can refer to usual designs;

(2) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims

What is claimed is:

1. A control method applied to an electric fracturing apparatus, wherein the electric fracturing apparatus comprises a plunger pump and a first motor configured to drive the plunger pump, and the method comprises:

acquiring a preset displacement of the plunger pump;

acquiring a rotation speed of the first motor and a discharge pressure of the plunger pump;

determining (a) a displacement factor according to the rotation speed of the first motor, (b) a displacement factor correction coefficient according to the discharge pressure of the plunger pump, (c) a corrected displacement factor according to the displacement factor and the displacement factor correction coefficient; and (d) a real-time displacement of the plunger pump based on the corrected displacement factor; and upon the real-time displacement reaching the preset displacement, keeping the first motor in a stable operation state.

2. The control method according to claim 1, wherein a correspondence relationship between the discharge pressure of the plunger pump and the displacement factor correction coefficient is stored in a look-up table, and determining the displacement factor correction coefficient according to the discharge pressure of the plunger pump, comprises:

searching the displacement factor correction coefficient corresponding to the discharge pressure of the plunger pump in the look-up table.

3. The control method according to claim 1, wherein the electric fracturing apparatus further comprises a second motor configured to drive the first motor and an auxiliary system of the plunger pump, and the method further comprises:

in response to start or stop of the first motor, allowing the second motor to be automatically started or stopped, and automatically controlling the second motor to run in a stable state after the second motor is automatically started.

4. The control method according to claim 3, wherein automatically controlling the second motor to run in the stable state after the second motor is automatically started, comprises:

acquiring a preset parameter and a first actual parameter of the electric fracturing apparatus;

judging whether the first actual parameter is greater than the preset parameter, wherein if the first actual parameter is greater than the preset parameter, the rotation speed of the second motor is adjusted.

5. The control method according to claim 1, further comprising:

optimizing a lubrication duration of the plunger pump, wherein optimizing the lubrication duration of the plunger pump comprises:

setting the lubrication duration and a non-lubrication duration; and after continuously lubricating the plunge pump for the lubrication duration, stopping lubricating the plunge pump for the non-lubrication duration.

6. The control method according to claim 1, further comprising:

optimizing a lubrication duration of the plunger pump, wherein optimizing the lubrication duration of the plunger pump comprises:

setting a lubrication pulse number and a non-lubrication pulse number; and after continuously lubricating the plunger pump for the lubrication pulse number, stopping lubricating the plunger pump for the non-lubrication pulse number.

7. The control method according to claim 1, further comprising:

setting a preset threshold;

acquiring a second actual parameter of the electric fracturing apparatus and a theoretical parameter of the electric fracturing apparatus; and judging whether a difference between the second actual parameter and the theoretical parameter is greater than the preset threshold, wherein if the difference between the second actual parameter and the theoretical parameter is greater than the preset threshold, an abnormal alarm is given.

8. The control method according to claim 7, wherein the second actual parameter and the theoretical parameter are respectively an actual power of the first motor and a theoretical power of the first motor, or are respectively an actual temperature of a winding of the first motor and a theoretical temperature of the winding of the first motor, or are respectively an actual discharge pressure of the plunger pump and a theoretical discharge pressure of the plunger pump, or are respectively an actual power of a second motor and a theoretical power of the second motor, or are respectively an actual displacement of the plunger pump and a theoretical displacement of the plunger pump, and wherein the second motor is configured to drive the first motor and an auxiliary system of the plunger pump.

9. The control method according to claim 8, wherein the theoretical temperature of the winding of the first motor is obtained based on a current of the first motor, an ambient temperature and a heat dissipation power of a heat dissipation fan.

10. The control method according to claim 8, wherein the theoretical discharge pressure of the plunger pump is obtained based on a torque of the first motor.

11. The control method according to claim 8, wherein the second motor comprises a high and low pressure lubrication oil pump motor configured to lubricate the plunger pump, and acquiring the theoretical parameter of the electric fracturing apparatus, comprises:

acquiring a lubrication oil pressure of the plunger pump and a rotation speed of the high and low pressure lubrication oil pump motor; and acquiring a theoretical lubrication power as the theoretical parameter based on the lubrication oil pressure and the rotation speed of the high and low pressure lubrication oil pump motor.

12. The control method according to claim 3, further comprising:

acquiring a warning limit value of each motor of the electric fracturing apparatus and an alarm limit value of each motor of the electric fracturing apparatus;

judging whether an actual power of the respective motor is greater than the warning limit value, wherein if the actual power of the respective motor is greater than the warning limit value, a warning is given; and judging whether the actual power of the respective motor is greater than the alarm limit value, wherein if the actual power is greater than the alarm limit value, the rotation speed of the respective motor is reduced, so that the actual power of the respective motor is lower than the warning limit value.

13. A control device applied to an electric fracturing apparatus, wherein the electric fracturing apparatus comprises a first motor configured to drive a plunger pump to operate, and the control device comprises:

a first acquisition unit configured to acquire a preset displacement of the plunger pump;

a second acquisition unit configured to acquire a rotation speed of the first motor and a discharge pressure of the plunger pump;

an adjustment unit configured to determine (a) a displacement factor according to the rotation speed of the first motor, (b) a displacement factor correction coefficient according to the discharge pressure of the plunger pump, (c) a corrected displacement factor according to the displacement factor and the displacement factor correction coefficient; and (d) a real-time displacement of the plunger pump based on the corrected displacement factor; and a keeping unit configured to keep the first motor in a stable operation state upon the real-time displacement reaching the preset displacement.

14. The control device according to claim 13, wherein the electric fracturing apparatus further comprises a second motor, and the second motor is configured to drive the first motor and an auxiliary system of the plunger pump, and be automatically started or stopped in response to the start or stop of the first motor, and be automatically controlled to run in a stable state after being automatically started.

* * * * *